United States Patent
Ellison et al.

(10) Patent No.: US 7,542,650 B2
(45) Date of Patent: Jun. 2, 2009

(54) LATCHING TROUGH-COUPLING SYSTEM

(75) Inventors: Steven W. Ellison, Mead, WA (US); James Patrick Jenkins, Liberty Lake, WA (US)

(73) Assignee: Telect Inc., Liberty Lake, WA (US)

( * ) Notice: Subject to any disclaimer, the term of this patent is extended or adjusted under 35 U.S.C. 154(b) by 505 days.

(21) Appl. No.: 11/275,217

(22) Filed: Dec. 19, 2005

(65) Prior Publication Data

US 2007/0155359 A1    Jul. 5, 2007

(51) Int. Cl.
G02B 6/00 (2006.01)
F16L 3/00 (2006.01)
F16C 11/06 (2006.01)
F16B 13/00 (2006.01)
B25G 3/18 (2006.01)
F16L 23/00 (2006.01)
E21D 11/22 (2006.01)
F16D 1/00 (2006.01)
E04B 9/16 (2006.01)

(52) U.S. Cl. .......... 385/136; 385/53; 385/100; 385/134; 385/135; 385/137; 385/138; 248/49; 248/51; 248/65; 248/68.1; 403/56; 403/293; 403/300; 403/325; 403/341; 403/363; 403/375; 403/387

(58) Field of Classification Search ............ 385/53, 385/100, 134, 135, 136, 137, 138; 248/49, 248/51, 65, 68.1; 403/56, 293, 300, 325, 403/341, 363, 375, 387
See application file for complete search history.

(56) References Cited

U.S. PATENT DOCUMENTS

| D347,209 S | 5/1994 | Henneberger |
| D348,651 S | 7/1994 | Henneberger |
| 5,752,781 A | 5/1998 | Haataja et al. |
| 5,792,993 A | 8/1998 | Rinderer |
| 6,076,779 A | 6/2000 | Johnson |
| 6,424,779 B1 | 7/2002 | Ellison et al. |
| 6,512,875 B1 | 1/2003 | Johnson et al. |
| 6,575,654 B2 | 6/2003 | Wentworth et al. |
| 6,603,073 B2 | 8/2003 | Ferris |
| 6,609,684 B2 | 8/2003 | Van Scoy et al. |
| 6,709,186 B2 | 3/2004 | Ferris et al. |

(Continued)

FOREIGN PATENT DOCUMENTS

GB    2349514    11/2000

(Continued)

OTHER PUBLICATIONS

EPO Communication with Search Report dated Mar. 30, 2007, from counterpart EP patent application, European Patent Application No. 06025977.7, copy attached, 3 pages.

*Primary Examiner*—Brian Healy
*Assistant Examiner*—Hung Lam
(74) *Attorney, Agent, or Firm*—Lee & Hayes, PLLC

(57) ABSTRACT

A telecommunications infrastructure includes first and second trough members for routing signal-carrying fibers. A coupler is used to releasably couple the first and second trough members together. The coupler includes a first pair of rotatable latches for releasably securing the first trough member to the coupler, and a second pair of rotatable latches for releasably securing the second trough member to the coupler.

19 Claims, 6 Drawing Sheets

U.S. PATENT DOCUMENTS

| | | |
|---|---|---|
| 6,715,719 B2 | 4/2004 | Nault et al. |
| 6,796,437 B2 | 9/2004 | Krampotich et al. |
| 7,246,778 B2 * | 7/2007 | Caveney et al. ............ 248/68.1 |
| 2003/0183732 A1 | 10/2003 | Nault et al. |
| 2004/0159750 A1 * | 8/2004 | Ferris et al. ................ 248/68.1 |
| 2007/0248309 A1 * | 10/2007 | Ferris et al. ................. 385/134 |

FOREIGN PATENT DOCUMENTS

| | | |
|---|---|---|
| WO | WO0231937 | 4/2002 |
| WO | WO0233445 | 4/2002 |

* cited by examiner

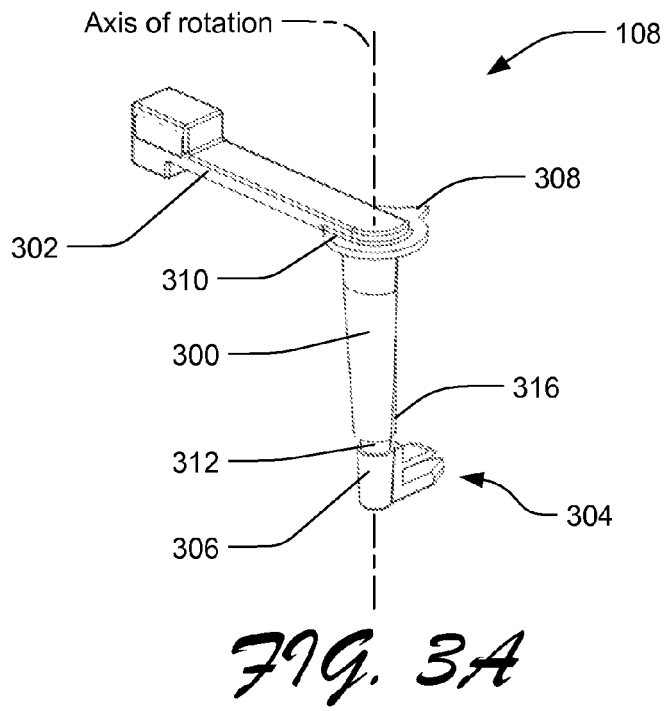
*FIG. 3A*
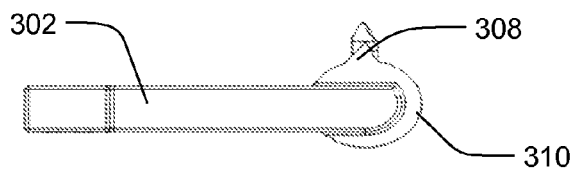
*FIG. 3B*
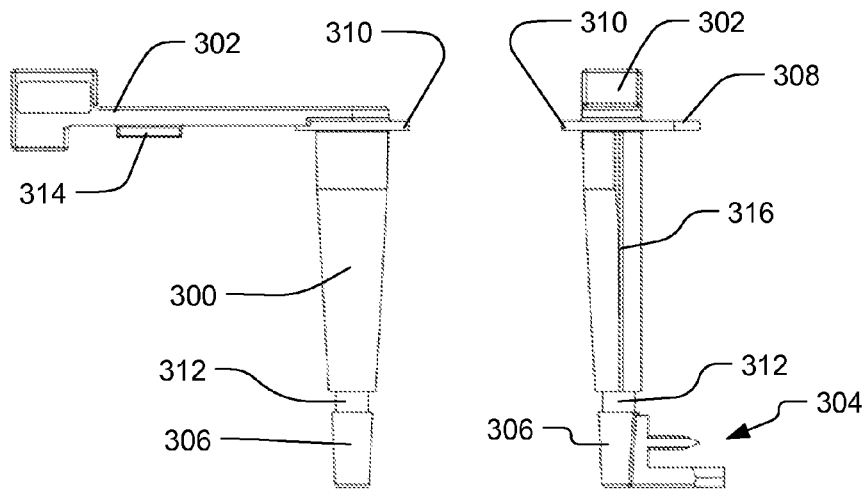
*FIG. 3C*    *FIG. 3D*

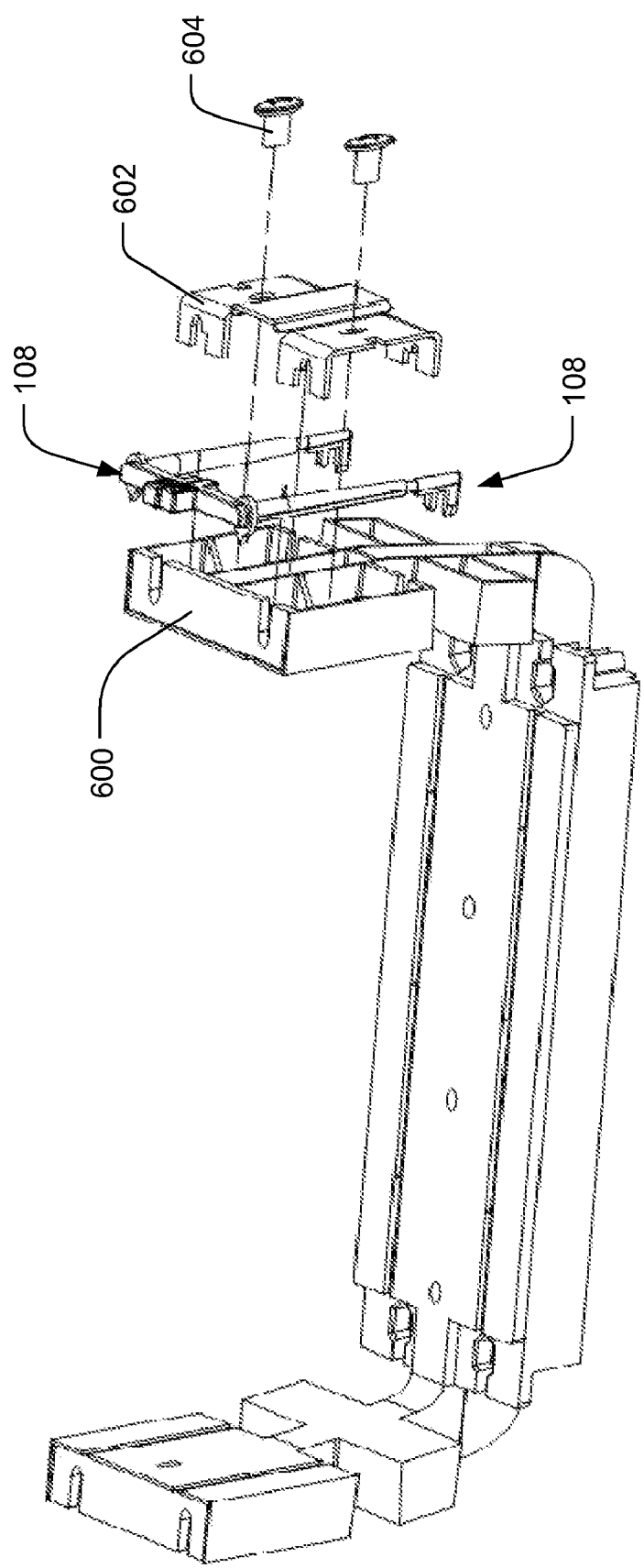

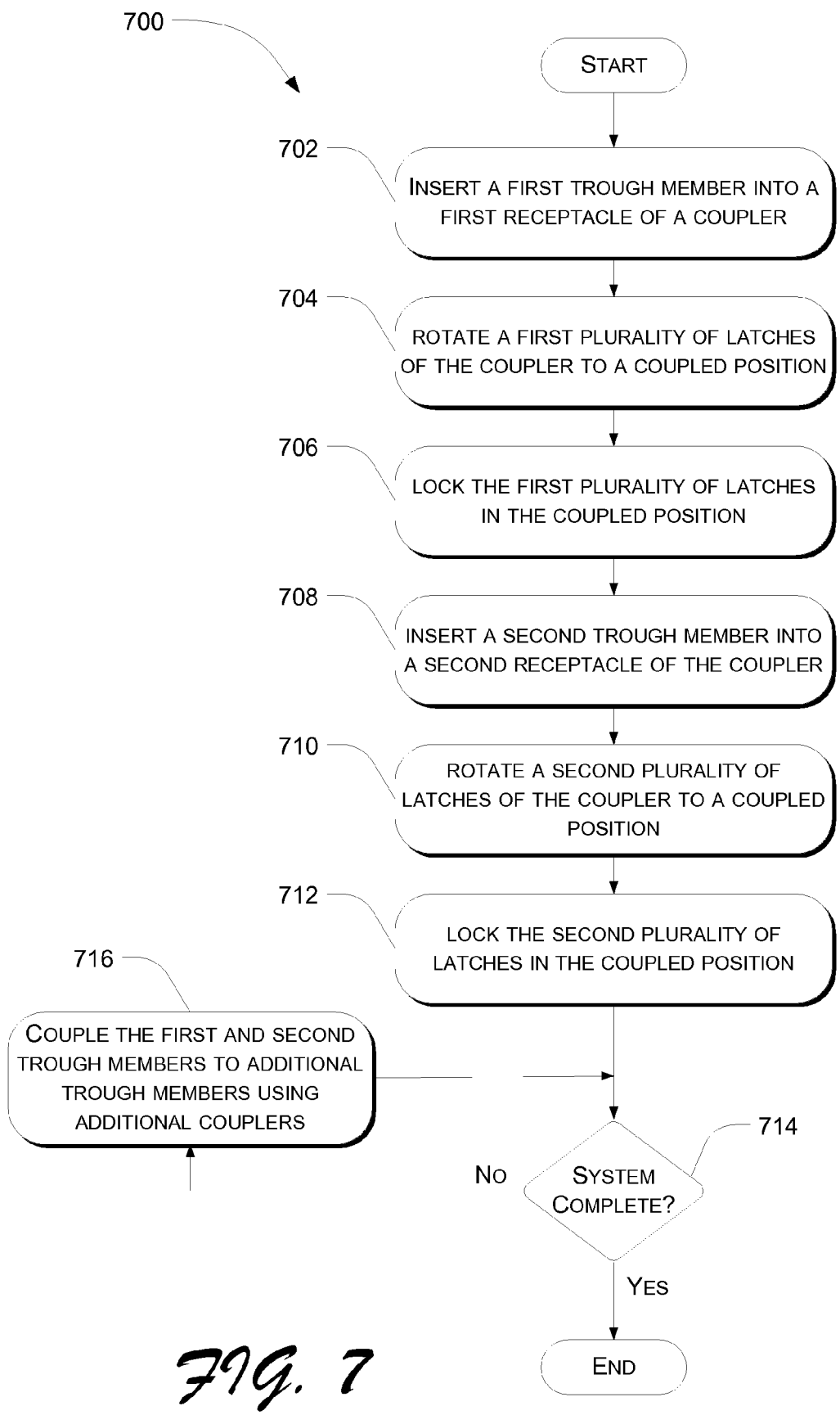

LATCHING TROUGH-COUPLING SYSTEM

TECHNICAL FIELD

The disclosure relates generally to trough-coupling systems for managing and organizing fibers, such as optical fibers.

BACKGROUND

Optical fibers can be used to transmit large volumes of data and voice signals over relatively long distances, with little or no signal degradation. For this reason, optical fibers have become widely used in the telecommunication field. As the use of optical fibers has increased, new systems have been developed for managing and organizing larger numbers of optical fibers.

In a typical telecommunications facility, a trough system is used to route the fiber optic cables. Generally, the trough system is located overhead and over the location of the fiber optic racks, cabinets, and other equipment. The trough system in even a small telecommunications facility can be substantial, requiring significant time and expense to install. Some systems require tools for installation of the trough system, adding to the assembly time and expense. Even systems that do not require tools for installation of the system may require tools for disassembly of the trough system, making it difficult to reconfigure or move the trough system once it is installed.

SUMMARY

Trough systems and components are disclosed, which can be assembled and disassembled quickly and easily, typically without any tools. In one aspect, a telecommunications infrastructure includes first and second trough members for routing signal-carrying fibers. A coupler is used to releasably couple the first and second trough members together. The coupler includes a first pair of rotatable latches for releasably securing the first trough member to the coupler, and a second pair of rotatable latches for releasably securing the second trough member to the coupler.

In another aspect, a coupler is disclosed for releasably coupling first and second trough members together. The coupler includes a coupler body, a first pair of rotatable latches for releasably securing a trough member to the coupler, and a second pair of rotatable latches for releasably securing another trough member to the coupler.

Methods of assembling telecommunications infrastructures are also disclosed.

BRIEF DESCRIPTION OF THE DRAWINGS

The detailed description refers to the accompanying figures. In the figures, the left-most digit(s) of a reference number identifies the figure in which the reference number first appears. The use of the same reference numbers in different figures indicates similar or identical items.

FIG. 3A-3D are perspective, plan, front, and side views, respectively, of a latch of the exemplary trough-coupling system of FIG. 1.

FIG. 6 is an exploded view of a coupler of another exemplary trough-coupling system.

FIG. 7 is a flow chart showing an exemplary method of assembling a trough system.

DETAILED DESCRIPTION

Disclosed are implementations including trough-coupling systems and components thereof, such as couplers for coupling multiple trough members together. The disclosure is also directed to method of assembling and/or disassembling such trough-coupling systems. The trough-coupling systems can be assembled and disassembled without any tools. This helps to minimize the time and expense of installing trough-coupling system and/or reconfiguring or disassembling the trough-coupling system after installation.

The implementations are described in the context of an overhead trough system for managing optical fibers in a telecommunications facility. However, the implementations described herein may be used in other environments and are applicable to other contexts. For example, the trough systems may be located at any desired location, including overhead, below the floor, or at any location in between. In addition, the apparatuses may be used to manage fibers other than optical fibers, such as wires, Ethernet cables, coaxial cables, and/or other signal carrying fibers, and may be used in any environment in which such fibers are used.

Exemplary Trough-Coupling System(s)

Figure 1:
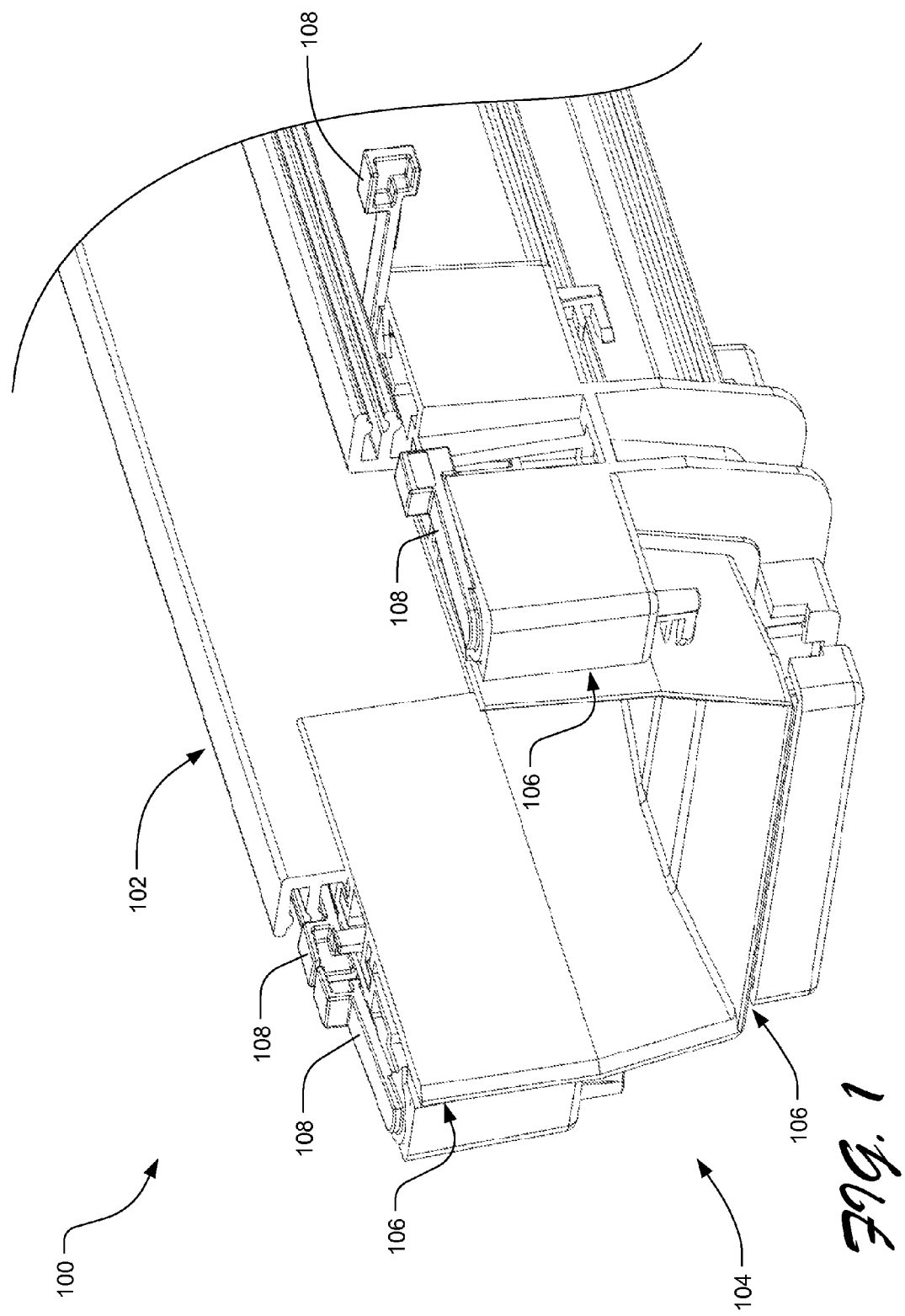
FIG. 1 is a perspective view showing a trough member coupled to a coupler in an exemplary trough-coupling system.

FIG. 1 illustrates a portion of an exemplary trough system 100 comprising a trough member 102 releasably held by a coupler 104. The trough system 100 may form a part of a telecommunications infrastructure for managing and routing optical fibers. While a second trough member is not shown in this figure for clarity, the coupler 104 can be used to releasably hold two trough members together. Also, while the coupler 104 shown is configured to receive and hold two trough members 102 end-to-end, it should be understood that couplers could be configured to releasably join any number of two or more trough members together and/or to join the trough members at different orientations relative to one another. A typical trough system might include a plurality of trough members of the same or different shapes, coupled together by a plurality of couplers of the same or different shapes and configurations. Trough systems may also include components for connecting the trough system to one or more other fiber management structures, such as racks, cabinets, chassis, and the like.

Generally, the trough member 102 fits in a gap or receptacle 106 of the coupler 104 and can be held in place by one or more latches 108. In the implementation shown, two latches 108 are used to releasably hold each trough member 102 in place. The latches 108 are rotatable between a released position (the right-most latch 108 in FIG. 1 is in the released position) for insertion of the respective trough member 102 into the receptacle 106, and a coupled position (the three other latches 108 in FIG. 1 are shown in the coupled position) for engaging and holding the respective trough member 102 in the receptacle 106. A user can easily secure the trough member 102 to the coupler 104 by simply inserting an end of the trough member 102 into the receptacle 106 in the coupler and rotating the latches 108 from the released position to the coupled position. As discussed further below, the latches 108 can then be locked in the coupled position to prevent them from being inadvertently released.

Figure 2:
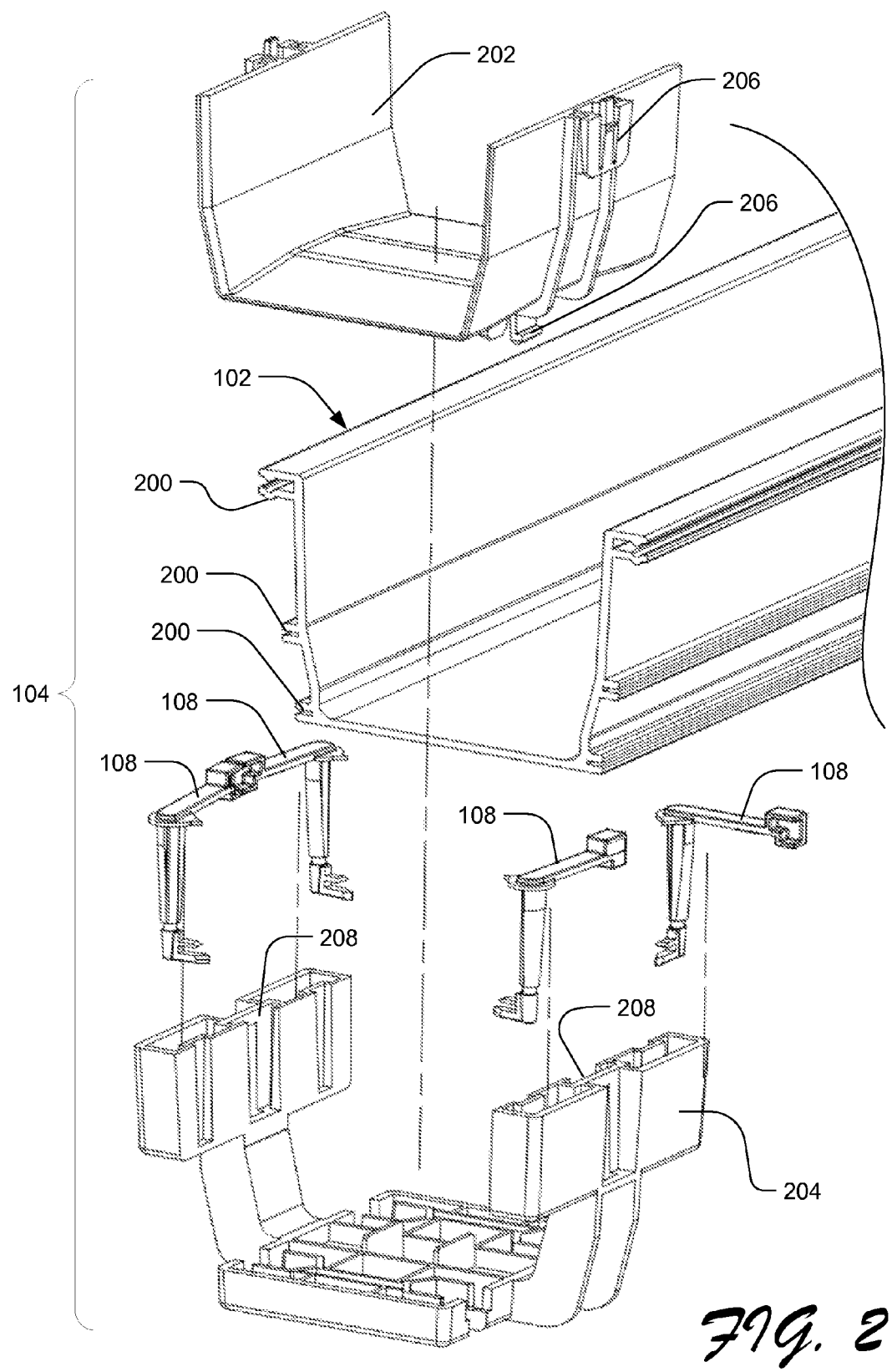
FIG. 2 is an exploded view showing the exemplary trough-coupling system of FIG. 1.

FIG. 2 is an exploded view showing the trough-coupling system 100 of FIG. 1 in more detail. As shown in this figure, the trough members 102 have one or more ridges 200 extending along all or part of the length of the trough members 102. The ridges 200 lend strength and rigidity to the trough members 102. The trough members 102 shown in the figures have three pairs of ridges 200 extending the entire length of the trough members 102. Of course, trough members 102 could have any number of ridges, or may have no ridges at all. In addition, it should be understood that the trough members 102 can be formed in virtually any desired shape, size, and configuration.

Figure 5:
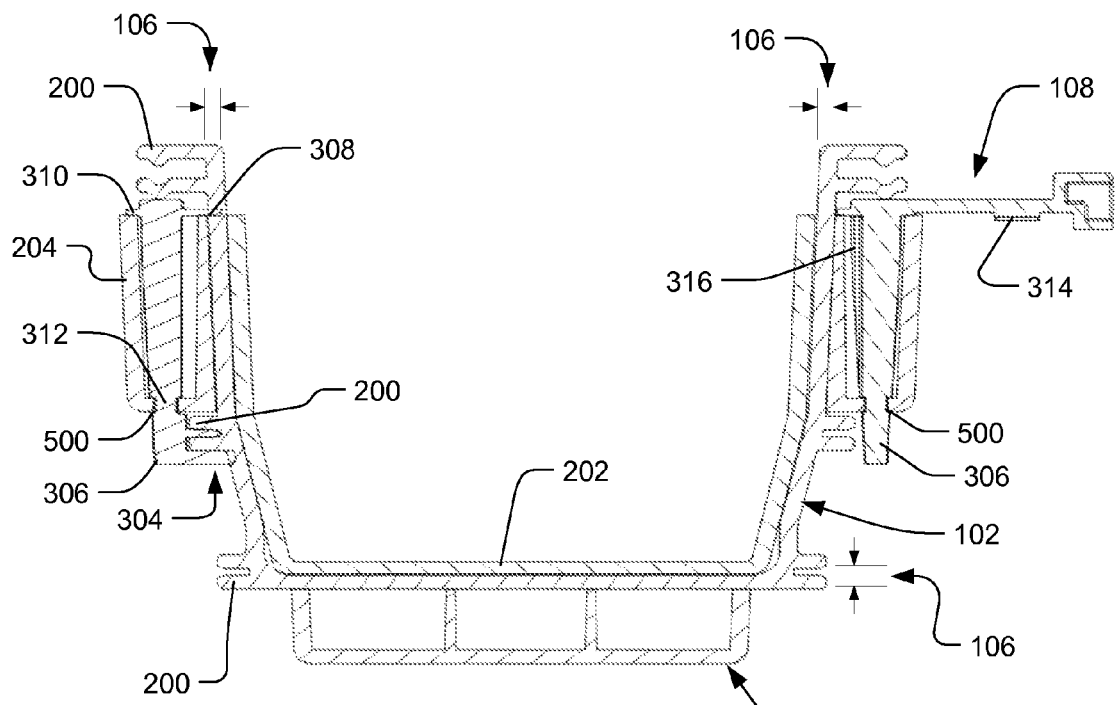
FIG. 5 is a cross-sectional view of the exemplary trough-coupling system of FIG. 4, taken along line 5-5.

The coupler 104 includes an inner wall section 202, which fits within a framework 204. The inner wall section 202 includes tabs 206, which snap into notches 208 in the framework 204, to hold the inner wall section 202 in place in the framework 204. A gap between the inner wall section 202 and the framework 204 defines the receptacles 106 for receiving the trough sections 102 (the gap is best shown in FIG. 5). Alternatively, couplers could be formed as single unitary bodies with receptacles formed therein.

The coupler 104 also includes four rotatable latches 108 disposed in the framework 204. The latches 108 are rotatable in the framework 204 between the released position (again the far right latch in FIG. 2 is shown oriented in the released position), in which a trough member 102 can be inserted in the corresponding receptacle 106, and a coupled position (the other three latches in FIG. 2 are shown oriented in the coupled position), in which a trough member in the receptacle will be engaged and held in place by the latch. In the coupler 104 shown, two latches 108 are used to secure each trough member 102 to the coupler 104. However, it should be understood that any number of one or more latches might be used to secure each trough member 102 to the coupler 104. In addition, if the coupler is configured to couple more than two trough members together, the coupler may include one or more additional latches for securing each additional trough member.

FIGS. 3A-3D depict a latch 108 of the coupler of FIG. 1 in more detail. The latch 108 comprises an elongated latch body 300 defining an axis about which the latch is rotatable. An actuator arm 302 is disposed at one end of the latch body 300. The actuator arm 302 extends radially outward from the axis to provide a lever, which can be used to rotate the latch 108. A first engaging portion 304 is disposed at a distal end 306 of the latch 108 (i.e., an opposite end of the latch body from the actuator). The first engaging portion 304 includes a pair of substantially parallel prongs extending radially from the axis. A second engaging portion 308 is disposed at the end of the latch body 300 proximate the actuator arm 302. The second engaging portion 308 comprises a point protruding from a disk-shaped shoulder 310 formed at the upper end of the latch body 300, adjacent to the actuator arm 302. The engaging portions 304, 308 are configured to engage the respective trough 102 to secure the trough to the coupler 104, when the latch is in the coupled position.

The latch 108 includes a retaining groove 312 formed around the circumference of the latch body 300 just above the distal end 306 of the latch 108. Apertures (not shown in this figure) are formed in the framework 204 of the couplers 104 for receiving the distal ends 306 of the latches 108. The apertures resemble key holes and are substantially the same shape as, but slightly smaller than, the distal ends 306 and engaging portions 304 of the latches 108. During assembly of the couplers 104, the distal ends 306 and engaging portions 304 of latches 108 can be pressed through the apertures until the retaining grooves 312 snap into the apertures. Because the distal ends 306 of the latches are larger than the apertures, the latches are retained in the apertures. As described in more detail with reference to FIG. 5 below, the shoulder 310 helps to stabilize the latches 108 for rotation in the coupler 104.

Referring to FIG. 3C, the each latch also includes a locking mechanism 314 disposed on the underside of the actuator arm 302. The locking mechanism 314 is adapted to engage a portion of the coupler 104 to hold the latch 108 in a coupled position engaging the respective trough member 102. Any suitable type of locking mechanism may be used to hold the latch in the coupled position, such as, for example, a wedge shaped block, a detent mechanism, an interference fit, and the like.

As shown in FIG. 3D, the latch body 300 is tapered toward the distal end 306 of the latch body 300. That is, the end of the latch body at which the actuator arm 302 is disposed is larger than the end of the latch body at which the engaging portion 304 is disposed. The latch body 300 also includes a rotation-limiting flange 316 extending most of the length of the latch body 300. The flange 316 limits rotation of the latches 108 in the coupler 104 to rotation between the coupled and released positions (e.g., about ninety degrees). Of course, the flange 316 could be configured to limit rotation to angles of more or less than ninety degrees. Moreover, latches 108 need not include a rotation-limiting flange at all.

While specific configurations of the latches 108 are described above, it should be understood that numerous other latch configurations may additionally or alternatively be used to secure the trough members to the couplers. For example, while the engagement portions are illustrated as being prongs and points that engage the trough member, the engagement portions could additionally or alternatively be configured as pads of high friction material that abut and side of the trough members to frictionally hold the trough members to the couplers. Additionally or alternatively, the latches could be spring biased toward either the coupled or released position. Numerous other latch configurations will be apparent to those of ordinary skill in the art.

Figure 4:
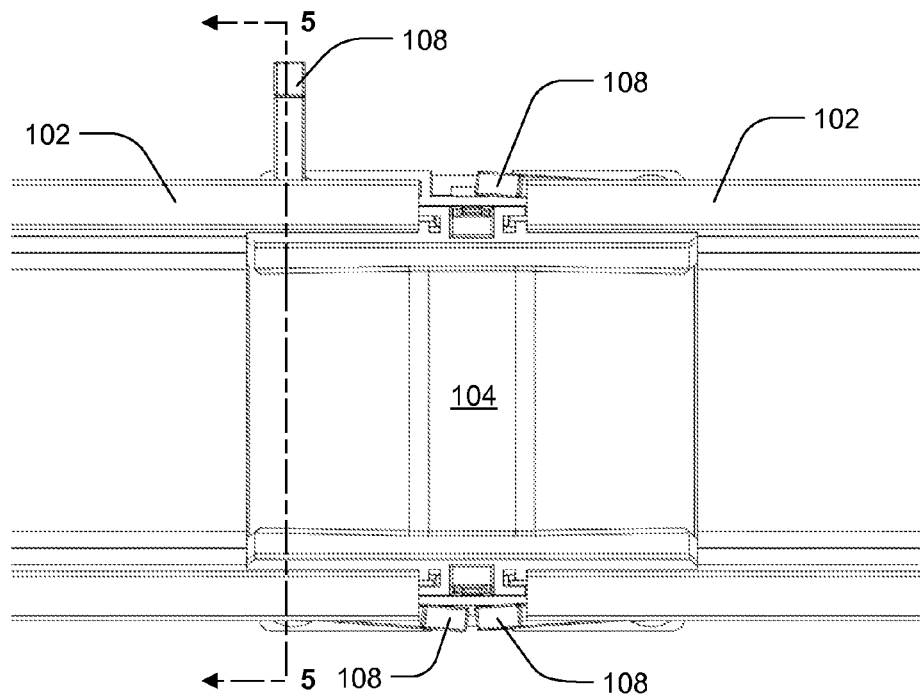
FIG. 4 is a plan view of an exemplary trough-coupling system showing two trough members coupled together by a coupler.

FIG. 4 is a plan view of the coupler 104 of FIG. 1, showing the coupler 104 coupling two trough members 102 together. Three of the four latches 108 of coupler 104 are shown in the coupled position. The fourth latch 108 (top left corner of FIG. 4) is shown in the released position.

FIG. 5 is a cross-sectional view of the coupler 104 of FIG. 4, taken along line 5-5 in that figure. As shown in FIG. 5, the trough member 102 is inserted in the receptacle 106 formed by the gap between the inner wall section 202 and the framework 204 of the coupler 104. The distal ends 306 and engaging portions 304 of latches 108 extend through apertures 500 in the framework 204 of the coupler 104. The retaining grooves 312 of the latches 108 fit in the apertures 500 to secure the latches 108 for rotation in the coupler 104. The shoulders 310 of the latches 108 ride on an upper surface of the framework 204 and stabilize the latches for smooth rotation relative to the coupler 104.

The right latch member 108 is shown in FIG. 5 in a release position and does not engage the trough member 102. In this position, the rotation-limiting flange 316 abuts a surface (not visible in this view) of the framework 204 to prevent the latch from further rotation (into the page) relative to the coupler 104. If both latches 108 were in this position, the trough member 102 would be free to move relative to the coupler 104. However, the left latch member 108 in FIG. 5 is in the coupled position and engages the trough member 102 to secure it to the coupler 104. In particular, the lower prong of the first engaging portion 304 digs into the side of the trough member 102, while the upper prong of the first engaging portion 304 fits between and engages two ridges 200 of the trough member 102. The second engaging portion 308 also digs into the side of the trough member 102 to further secure the trough member 102 to the coupler 104. Thus, each latch 108 engages the trough member 102 in three different locations when in the coupled position. As discussed above, the latches 108 can be locked in the coupled position by the locking mechanisms 314. To separate the trough member 102 from the coupler, a user has only to move the latches 108 corresponding to that trough member 102 to the released position. The trough member 102 will then be freely removable from the coupler 104.

FIG. 6 illustrates an alternative configuration of a coupler framework 600. The framework 600 is similar to that of FIGS. 1-5, except that the latches 108 are inserted from a side of the framework 600 and held in place by a mounting plate 602 and fasteners 604, rather than being pressed down through apertures in the framework as in FIGS. 1-5.

The trough-coupling system and the components thereof can be made of any material having the desired combination of strength, cost, weight, electrical conductivity, and other material properties, and can be made by conventional manufacturing and assembling processes. Several suitable materials include, for example, metals, plastics, polymers, composites, and the like.

Exemplary Assembly Method

FIG. 7 illustrates an exemplary method 700 of assembling a trough system of, for example, a telecommunications infrastructure. Of course, the method can be used to assemble trough systems in any other environment. At 702 a first trough member is inserted into a first receptacle of a coupler. At 704 a first plurality of latches of the coupler are rotated to a coupled position, in which engaging portions of the first plurality of latches engage the first trough member and secure the first trough member in the first receptacle of the coupler. At 706, the first plurality of latches is locked in the coupled position by. At 708, a second trough member is inserted into a second receptacle of the coupler. At 710, a second plurality of latches of the coupler are rotated to a coupled position, in which engaging portions of the second plurality of latches engage the second trough member and secure the second trough member in the second receptacle of the coupler. In the implementations shown, each of the first and second plurality of latches comprises two latches. At 712, the second plurality of latches is locked in the coupled position.

At 714, a determination is made as to whether the trough system is complete. If yes, the method comes to an end. If not, the method proceeds to 716, where additional trough members are coupled to the first and second trough members by additional couplers. The method then returns to 714, where it is again determined whether the trough system is complete. The method repeats acts 714 and 716 until the trough system is complete. In this manner, as trough system can be assembled for use in a telecommunications infrastructure or other environment.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A telecommunications infrastructure comprising:
   first and second trough members for routing signal-carrying fibers; and
   a coupler for releasably coupling the first and second trough members together, the coupler including a first pair of rotatable latches for releasably securing the first trough member to the coupler, and a second pair of rotatable latches for releasably securing the second trough member to the coupler;
   wherein each latch is rotatable between a coupled position in which the latch engages the respective trough member, and a released position in which the latch does not engage the respective trough member; and
   wherein each latch comprises an actuator portion by which the latch can be rotated between the coupled and released positions, and an engaging portion which engages the respective trough member when the latch is in the coupled position.

2. The system of claim 1, wherein each latch includes a locking mechanism for releasably locking the latch in the coupled position.

3. The system of claim 1, wherein the first and second trough members include ridges extending along at least a portion of the length of the trough members, and each of the latches includes the engaging portion adapted to engage at least one of the ridges when the latch is in the coupled position.

4. The system of claim 1, wherein each latch comprises:
   an elongated latch body defining an axis about which the latch is rotatable;
   an actuator arm disposed at one end of the latch body, the actuator arm extending radially outward from the axis to provide a lever a user can use to rotate the latch; and
   the engaging portion disposed at an opposite end of the latch body from the actuator arm, the engaging portion configured to engage the respective trough member to secure the trough member to the coupler.

5. The system of claim 4, wherein the engaging portion comprises a pair of prongs protruding radially from the axis.

6. The system of claim 4, further comprising a second engaging portion disposed at the end of the latch body proximate the actuator arm, the second engaging portion being configured to engage the respective trough to secure the respective trough member to the coupler.

7. The system of claim 4, wherein each latch further comprises a locking mechanism disposed on the actuator arm, the locking mechanism being adapted to engage a portion of the coupler to hold the latch in a position engaging the respective trough member.

8. The system of claim 4, wherein the latch body is tapered, the end of the latch body at which the actuator arm is disposed being larger than the end of the latch body at which the engaging portion is disposed.

9. The system of claim 1, further comprising a plurality of couplers coupling the first and second trough members to a plurality of additional trough members.

10. A coupler for releasably coupling first and second trough members together, the coupler comprising:
    a coupler body;
    a first pair of rotatable latches disposed in the body for releasably securing a trough member to the coupler; and
    a second pair of rotatable latches disposed in the body for releasably securing another trough member to the coupler,
    wherein each latch is rotatable between a coupled position in which the latch is adapted to engage the respective trough member, and a released position in which the latch is adapted not to engage the respective trough member, and wherein each latch comprises an actuator portion by which the latch can be rotated between the coupled and released positions, and an engaging portion adapted to engage the respective trough member when the latch is in the coupled position.

11. The coupler of claim 10, wherein each latch includes a locking mechanism for releasably locking the latch in the coupled position.

12. The coupler of claim 10, wherein each of the latches includes the engaging portion adapted to engage at least one ridge on the respective trough when the latch is in the coupled position.

13. The coupler of claim 10, wherein each latch comprises:
an elongated body defining an axis about which the latch is rotatable;
an actuator arm disposed at one end of the body, the actuator arm extending radially outward from the axis to provide a lever a user can use to rotate the latch; and
the engaging portion disposed at an opposite end of the body from the actuator arm, the engaging portion configured to engage the respective trough member to secure the trough member to the coupler.

14. The coupler of claim 13, wherein the engaging portion comprises a pair of prongs protruding radially from the axis.

15. The coupler of claim 13, further comprising a second engaging portion disposed at the end of the latch body proximate to the actuator arm, the second engaging portion being configured to engage the respective trough member to secure the respective trough member to the coupler.

16. The coupler of claim 13, wherein each latch further comprises a locking mechanism disposed on the actuator arm, the locking mechanism being adapted to engage a portion of the coupler to hold the latch in a position engaging the respective trough member.

17. The coupler of claim 13, wherein the latch body is tapered, the end of the latch body at which the actuator arm is disposed being larger than the end of the latch body at which the engaging portion is disposed.

18. A method of assembling a trough system of a telecommunications infrastructure comprising:
inserting a first trough member into a first receptacle of a coupler;
rotating a first plurality of latches of the coupler to a coupled position, in which engaging portions of the first plurality of latches engage the first trough member and secure the first trough member in the first receptacle of the coupler; and
locking the first plurality of latches in the coupled position,
wherein each latch is rotatable between the coupled position in which the latch is adapted to engage the first trough member, and a released position in which the latch is adapted not to engage the first trough member, and
wherein each latch comprises an actuator portion by which the latch can be rotated between the coupled and released positions, and wherein the engaging portion is adapted to engage the respective trough member when the latch is in the coupled position.

19. The method of claim 18, further comprising:
inserting a second trough member into a second receptacle of the coupler;
rotating a second plurality of latches of the coupler to a coupled position, in which engaging portions of the second plurality of latches engage the second trough member and secure the second trough member in the second receptacle of the coupler; and
locking the second plurality of latches in the coupled position.

* * * * *